Aug. 24, 1943.     C. C. BENNETT     2,327,617
BRAKE TESTING APPARATUS
Original Filed June 19, 1936    2 Sheets-Sheet 1
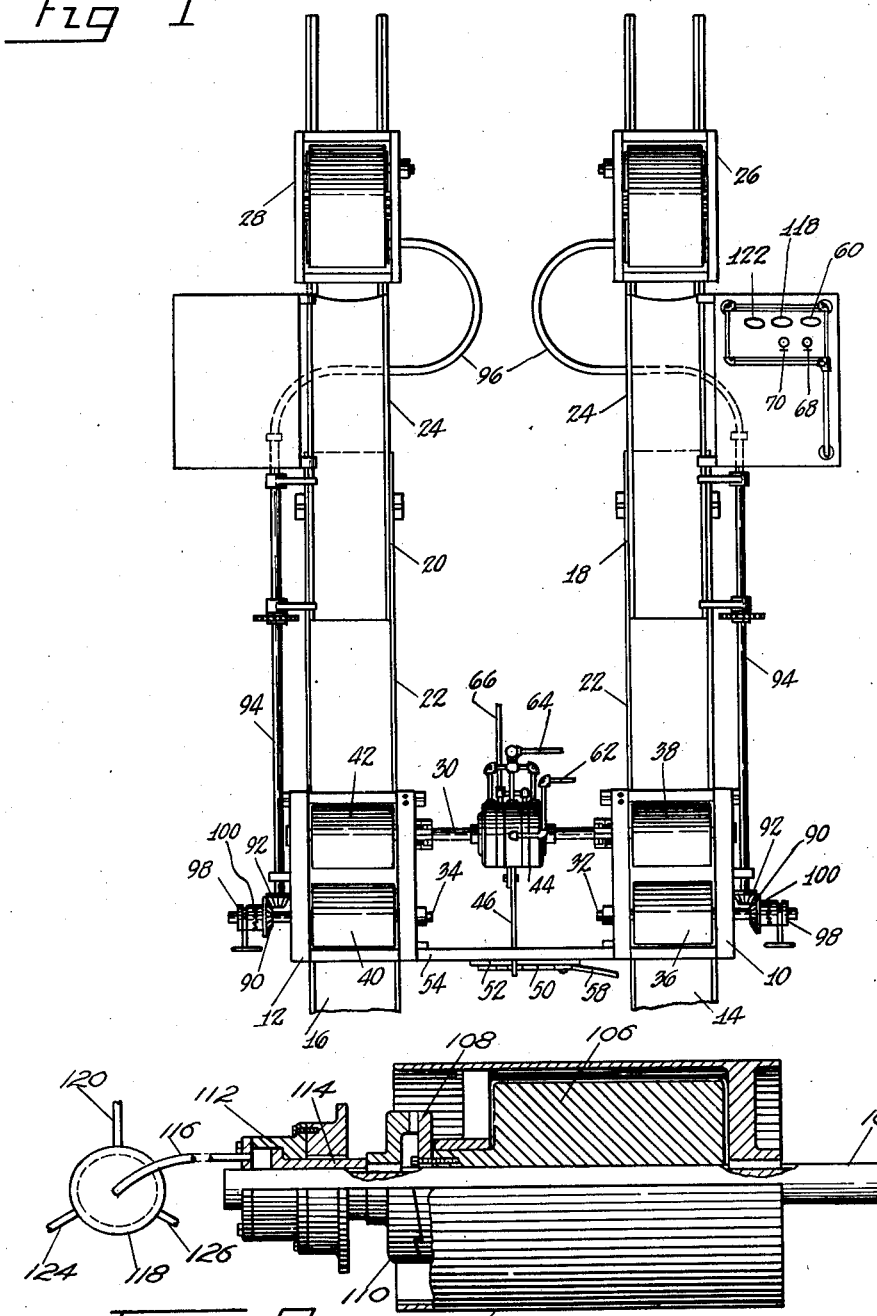
INVENTOR.
CLAUDE C. BENNETT
BY
ATTORNEY.

Aug. 24, 1943.   C. C. BENNETT   2,327,617
BRAKE TESTING APPARATUS
Original Filed June 19, 1936   2 Sheets-Sheet 2
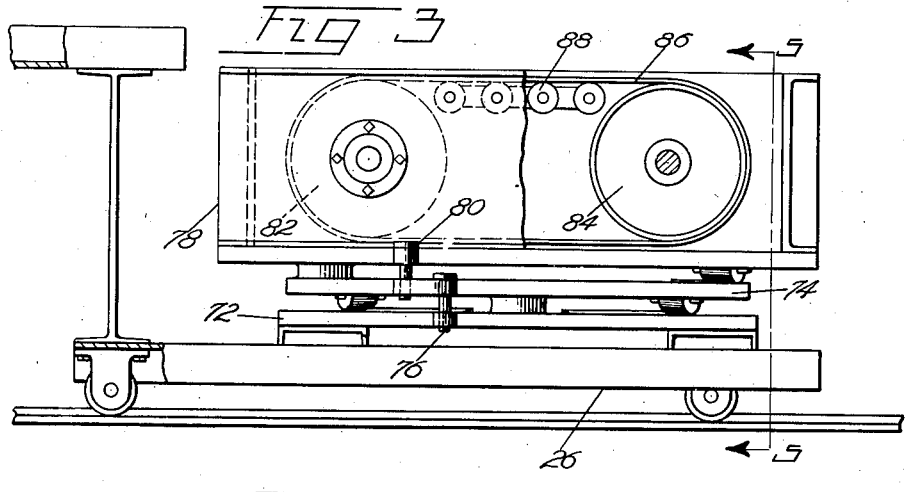
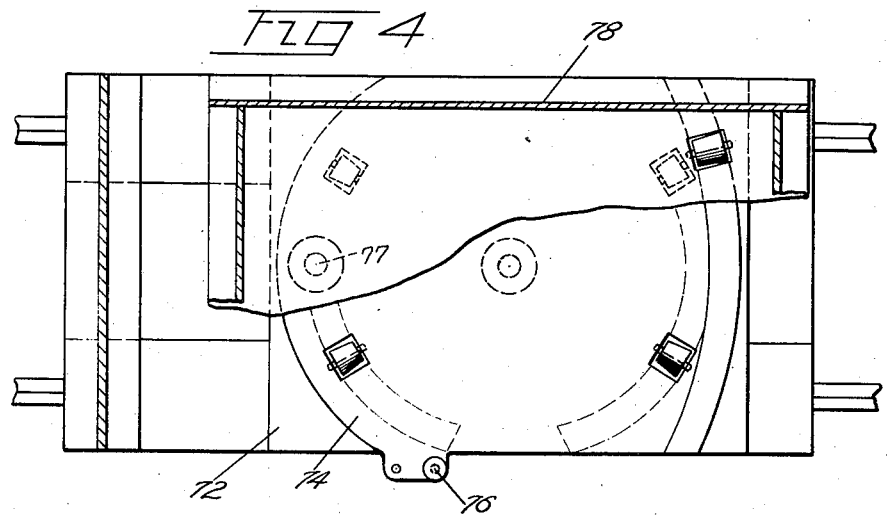
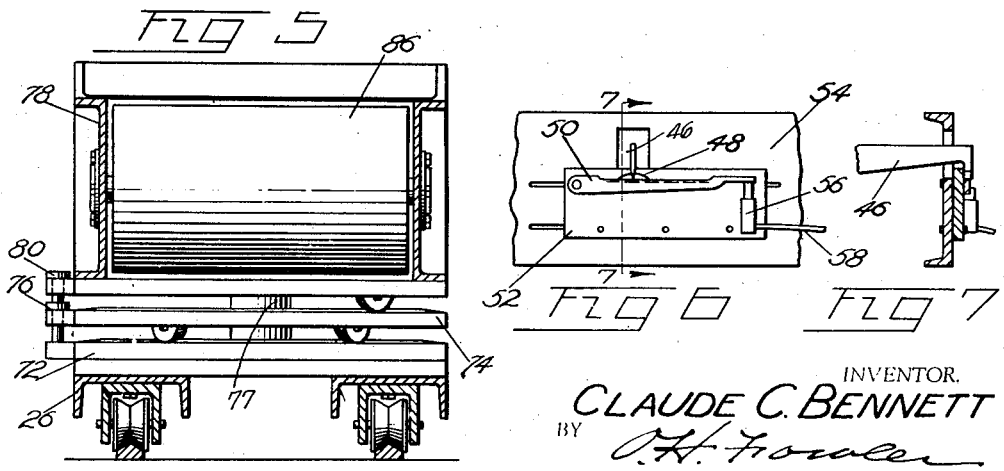
INVENTOR.
CLAUDE C. BENNETT
BY
ATTORNEY.

Patented Aug. 24, 1943

2,327,617

UNITED STATES PATENT OFFICE 2,327,617

BRAKE TESTING APPARATUS

Claude C. Bennett, South Bend, Ind., assignor to A. E. Feragen, Inc., Seattle, Wash., a corporation of Washington Continuation of application Serial No. 86,123, June 19, 1936. This application filed September 25, 1939. Serial No. 296,479

9 Claims. (Cl. 73—51)

This invention relates to brake testing apparatus.

The instant application is a continuation of my co-pending application, Serial No. 86,123, filed June 19, 1936, Automobile testing machines.

Broadly the invention comprehends an apparatus for testing the brakes of a motor vehicle wherein the resistance of the brakes is determined while the wheels of the vehicle are in motion as in actual use of the brakes in normal usage of the vehicle.

An object of the invention is to provide a brake testing apparatus for motor vehicle brakes of the dynamic type wherein actual road conditions, particularly the inertia of the vehicle, are simulated.

Another object of the invention is to provide an improved means for supporting and rotating the front wheels of a motor against the resistance of their associated brakes.

Other objects and advantages of the invention will appear from the following description taken in connection with the accompanying drawings forming a part of this specification, and in which—

Fig. 1 is a top plan view of a brake testing apparatus embodying the invention;

Fig. 2 is a view partly in elevation and partly in section illustrating a preferred construction of a wheel supporting roller;

Fig. 3 is a side elevation of a movable wheel carriage;

Fig. 4 is a top plan view of the carriage partly in horizontal cross section;

Fig. 5 is a sectional view taken substantially on line 5—5, Fig. 3;

Fig. 6 is a detail view of the dynamometer torque arm and cooperating parts; and Fig. 7 is a sectional view taken substantially on line 7—7, Fig. 6.

Referring to the drawings, a pair of corresponding frames 10 and 12 are arranged in spaced parallel relation to one another. The frames are preferably elevated, and ramps 14 and 16 are provided at the approach ends thereof. A pair of corresponding runways 18 and 20 each including telescopic sections 22 and 24 are secured to the forward ends of the frames, and corresponding movable carriages 26 and 28 support the forward ends of the runways. By adjusting the runways, the overall length of the machine may be increased or decreased to accommodate motor vehicles of varying wheel base.

A transverse shaft 30 is suitably journaled on the frames 10 and 12, and shafts 32 and 34 are journaled on the respective frames 10 and 12 in spaced parallel relation to the shaft 30. A pair of rollers 38 and 36 are secured to the shafts 30 and 32 respectively within the frame 10, and correspondingly a pair of rollers 42 and 40 are secured to the shafts 30 and 34 respectively within the frame 12. The respective pairs of rollers serve to suitably cradle the driving wheels of a motor vehicle.

A dynamometer case 44 mounted for oscillation on the shaft 30 between the frames 10 and 12 encloses a dynamometer (not shown) preferably of the type fully disclosed in my co-pending application, Serial No. 164,438, filed September 13, 1937. As shown, the dynamometer case 44 has suitably secured thereto a torque arm 46 bearing on a slide 48 movable on an arm 50 pivoted on a plate 52 slidably mounted on a cross-member 54 connecting the frames 10 and 12. The free end of the arm 50 engages the actuator of a fluid pressure producing device 56 of any suitable type, and the fluid pressure producing device is connected by a fluid pressure delivery pipe or conduit 58 to an indicating instrument 60 arranged on a suitable instrument board. The dynamometer case 44 has an air inlet 62 and a water supply system including inlets 64 and outlets 66, the latter preferably controlled by suitable valves 68 and 70 suitably arranged on the instrument board.

In practice, the driving wheels of the motor vehicle are cradled for rotation on the respective pairs of rollers 36, 38 and 40, 42. The driving wheels are driven by the power plant of the vehicle, and the rollers are driven by frictional engagement of the driving wheels therewith. Rotation of the rollers 38 and 42 and, accordingly, rotation of the shaft 30, activates the dynamometer so that the power derived from the power plant of the vehicle may be ascertained and the load thereon controlled.

The movable carriages 26 and 28 each include a base 72 having thereon a turntable 74 normally held against movement by a lockpin 76, and pivotally mounted on this turntable at 77 is a frame 78 normally held against movement by a lockpin 80. A pair of spaced rollers 82 and 84 are journaled in the frame 78, and a belt 86 connecting the rollers is supported between the rollers by a plurality of relatively small rollers 88 arranged in spaced parallel relation to one another so as to inhibit sagging of the belt. While this structure is admirably adaptable for testing a motor vehicle as to its steering geometry, it is equally desirable for the purpose of supporting the front wheels of a vehicle, the brakes of which are to undergo test.

The front wheels of the vehicle rest upon the belts 86 and are driven by frictional engagement therewith in the same direction of rotation as that of the driving wheels of the vehicle. To this end the shafts 32 and 34 are extended, and beveled driving gears 90 sleeved on the extensions are adapted to mesh with beveled gears 92 on driving shafts 94 supported on the sides of the runways 18 and 20 and connected by flexible shafts 96 to the rollers 82. Clutch members 98 splined on the extended portions of the shafts 32 and 34 cooperate with clutch members 100 on the driving gears 90 so that the driving means for the belts 86 may be controlled as may be desired or required during the test.

A preferred construction of the rollers 36 and 40 is illustrated in Fig. 2, and the same or a similar construction may be incorporated in one of the pulleys 82 or 84. It is obvious that in testing the brakes of a motor vehicle while it is stationary, unless there is some element tending to continue rotation of the wheels in the same manner as the inertia of the vehicle traveling along the road tends to continue the wheels in rotation, a true test of the braking action cannot be attained. To simulate the inertia of a motor vehicle traveling at any given speed upon a roadway, it is proposed to provide inertia means tending to continue rotation of the rollers supporting the wheels of the vehicle so that each wheel may be urged to continue its rotation during the testing of the brakes associated with the wheels.

A preferred construction of the rollers to accomplish this end includes a hollow roller 102 keyed to a shaft 104. A mass 106 similar to a flywheel having a clutch member 108 fixed thereto is mounted for rotation on the shaft, preferably within the roller. A clutch member 110 splined to the shaft 104 so as to slide thereon and to rotate therewith cooperates with the clutch member 108 as hereinafter discussed. A cylinder 112 surrounding the shaft has therein a plunger 114 also surrounding the shaft and cooperating with the slidable clutch member 110. The cylinder 112 has connected thereto a fluid pressure delivery pipe or conduit 116 controlled by a valve 118.

With the clutch members 108 and 110 engaged, the static inertia of the mass associated with each roller and with each wheel of the vehicle simulates the inertia of the vehicle in starting rotation of the driving wheels of the vehicle. As these commence to rotate, the fly wheel or mass is caused to rotate, and eventually achieves a speed corresponding to the speed of the driving wheels of the vehicle, which may correspond to any selective road speed. Each of the fly wheels now has acquired dynamic inertia, and if the brakes of the vehicle are applied, this dynamic inertia resists stoppage of rotation of the wheels of the vehicle, and in this way corresponds to the inertia of the vehicle traveling along the roadway to stoppage by its brakes.

To indicate the force on a brake, the valve 118, which may be positioned on the instrument board, is turned so that the conduit 116 is placed in communication with a fluid pressure delivery pipe or conduit 120 connected to a suitable indicating instrument 122, also located on the instrument board. A separate valve 118 and indicating instrument 122 for each wheel of the vehicle may be placed on the instrument board. When the power applied to drive the rolls is disconnected and the vehicle brakes are applied, the fly wheel or mass 106 tends to continue its rotation, while the vehicle brake tends to stop rotation of the roller, the inclined surfaces of the clutch members 108 and 110 will tend to ride upon one another, and the member 110 will be moved out of engagement with the member 108. This action will increase the pressure of the fluid in the cylinder 112 by the action of the plunger 114, and the pressure thus developed will be transmitted through the conduit 116, the valve 118 and conduit 120 to the brake indicating instrument 122. By suitable calibrations of the instrument, the distance within which the vehicle would have been stopped, or the brake effort required to effect that stop, may be determined.

The valve 118 may be manipulated to selectively place the conduit 116 in communication with a conduit 124 connected to a suitable source of pressure for actuating the clutch member 110 into engagement with the clutch member 108 or to interconnect the conduit 116 with a relief conduit 126 to relieve pressure and permit the clutch members to move apart.

In a brake testing operation, each of the brake indicating mechanisms may be operated separately or concomitantly. Thus, an operator may have before him comprehensive indications as to the condition of the individual brakes, and as to the equalization of the brakes under a given operating condition.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A machine for testing the brakes on the front wheels of a vehicle comprising a base, a wheel supporting member, means supporting the latter from the base for rotative movement about a vertical axis for movement transversely of the vehicle and for movement longitudinally of the vehicle, driven means to support the driving wheels of the vehicle, and power means driven by said driven means to effect such longitudinal movement of the wheel supporting member thereby tending to rotate the wheel on its spindle in opposition to any braking action upon the wheel.

2. A machine for testing automobile brakes comprising a base, a belt extending longitudinally of the automobile and adapted for supporting engagement beneath the steerable front wheel of an automobile, a pair of rollers about which said belt extends, a frame supporting said rollers, supporting means interposed between said frame and said base for rotative movement of the frame about a vertical axis intermediate the ends of the belt and for swinging movement about another vertical axis adjacent the rear end of the belt, driven means to support the driving wheels of the automobile, and means to drive said belt and rollers from the driven means.

3. A machine for testing the brakes of the steerable wheels of vehicles comprising a base and a wheel supporting member mounted thereon, an interposed member constraining the wheel supporting member to rotative movement about a given vertical axis, another interposed member constraining the wheel supporting member to lateral swinging movement about a different vertical axis, and means driven by the driving wheels of the vehicle to move the wheel supporting member lengthwise to the vehicle to rotate the wheel as the wheel is swung on its king pin.

4. A brake tester comprising a shaft, a wheel supporting cylinder carried by the shaft, an inertia mass rotatably mounted on the shaft, cooperating clutch means having engaged and disengaged positions carried by the shaft and mass, yielding means to urge the clutch means toward the engaged position, and mean to indicate a force urging the clutch means toward the disengaged position upon relative movement between the clutch means carried by the shaft and mass due to application of the brakes.

5. A brake tester comprising a shaft, a vehicle wheel supporting cylinder fixed to the shaft, an inertia mass rotatably mounted on the shaft, cooperating one-way drive and clutch means having engaged and disengaged positions carried by the shaft and mass whereby when the clutch means are engaged the vehicle wheel may drive the cylinder and mass, yielding means urging the clutch means toward the engaged position, and means to indicate a force urging the clutch means toward the disengaged position when the inertia mass tends to rotate faster than the shaft.

6. A wheel supporting member for a brake tester comprising a shaft, a shell fixed to the shaft for supporting a wheel, a mass rotatable on the shaft independent of the shell, a clutch member having cam elements on the mass, a clutch member carried by the shaft and having cam elements cooperating with the cam elements of the clutch member on the mass, means yieldingly engaging said cam elements of the clutch members with each other, and means for measuring the force developed due to the tendency of the clutch members to disengage because of relative movement between the mass and the shell upon application of brakes.

7. A wheel supporting member for a brake tester comprising a shaft, a shell fixed to the shaft, a mass rotatable on the shaft within the shell, a clutch member on the mass, an axially movable clutch member on the shaft cooperating with the clutch member on the mass, fluid pressure actuated means for urging the axially movable clutch member into engagement with the clutch member on the mass, and means for measuring the force developed by movement of the clutch member axially on the shaft relative to the clutch member on the mass upon relative movement between the shaft and mass by application of brakes.

8. A wheel supporting member for a brake tester comprising a shaft, a shell fixed to the shaft, an inertia mass rotatable on the shaft, a clutch element secured to the inertia mass, a clutch element splined to the shaft and having cam projections for cooperation with the clutch element on the inertia mass, means for engaging and yieldingly resisting disengagement of the clutch elements with each other, and means to measure the force required to overcome the yielding resistance to disengagement of the clutch elements caused by relative movement of the shaft and mass when the brake is applied.

9. A machine for testing the brakes on the steerable wheels of a motor vehicle having a base, wheel supporting means comprising a shaft having a horizontally extending axis and a cylinder fixed to the shaft for supporting a wheel, a mass rotatable on the shaft independent of the cylinder, means interposed between the wheel supporting means and the base whereby the wheel supporting means may move about a substantially vertical axis for movement transversely of the vehicle, power means to move the wheel supporting means about said horizontal axis to rotate the wheel in opposition to a braking force exerted thereon, cooperating clutch members carried by the shaft and mass, yielding means urging the clutch members toward engaging position relative to each other, and means for measuring the force urging the clutch members out of engaging position as the shaft and mass move relatively to each other upon application of brakes.

CLAUDE C. BENNETT.

CERTIFICATE OF CORRECTION.

Patent No. 2,327,617.                                                August 24, 1943.

CLAUDE C. BENNETT.

It is hereby certified that error appears in the printed specification of the above numbered patent requiring correction as follows: Page 3, first column, line 13, claim 4, for "mean" read --means--; and that the said Letters Patent should be read with this correction therein that the same may conform to the record of the case in the Patent Office.

Signed and sealed this 18th day of January, A. D. 1944.

Henry Van Arsdale, (Seal)                                  Acting Commissioner of Patents.